(12) United States Patent
Waara

(10) Patent No.: US 8,064,096 B2
(45) Date of Patent: Nov. 22, 2011

(54) DOCUMENT TEMPLATE DERIVED FROM VARIABLE DATA PRINT FILE

(75) Inventor: Patrick J. Waara, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1335 days.

(21) Appl. No.: 11/359,640

(22) Filed: Feb. 22, 2006

(65) Prior Publication Data

US 2007/0195368 A1    Aug. 23, 2007

(51) Int. Cl.
*G06K 15/10* (2006.01)

(52) U.S. Cl. ...... 358/1.5; 358/1.13; 358/1.15; 358/1.18; 382/209; 400/62; 707/620; 715/205; 715/235; 715/243; 715/780

(58) Field of Classification Search ............... 358/1.5, 358/1.13, 1.15, 1.18; 715/205, 234, 235, 715/236, 239, 243, 248, 255, 742, 780; 382/209; 400/62; 707/602
See application file for complete search history.

(56) References Cited

U.S. PATENT DOCUMENTS

| | | | |
|---|---|---|---|
| 6,032,004 A | 2/2000 | Mirabella, Jr. et al. | |
| 6,919,967 B1 * | 7/2005 | Pentecost et al. | ............ 358/1.15 |
| 7,278,094 B1 * | 10/2007 | Dreyer et al. | ................ 715/234 |
| 7,505,984 B1 * | 3/2009 | Nevill-Manning et al. | ........... 1/1 |
| 2002/0159551 A1 | 10/2002 | Ekvetchavit et al. | |
| 2002/0191219 A1 | 12/2002 | Bondy et al. | |
| 2003/0189726 A1 * | 10/2003 | Kloosterman et al. | ........ 358/1.18 |
| 2004/0205656 A1 * | 10/2004 | Reulein et al. | ................ 715/530 |
| 2005/0094207 A1 * | 5/2005 | Lo et al. | ........................ 358/1.18 |
| 2005/0097450 A1 * | 5/2005 | Lumera et al. | ................. 715/511 |
| 2005/0141035 A1 | 6/2005 | Buckley | |
| 2005/0180648 A1 | 8/2005 | Curry et al. | |

OTHER PUBLICATIONS

The PPML Functional Specification, Version 2.1, The PPML Working Group, Jul. 31, 2002.*
English Abstract and 1 drawing of KR 2004-090866 A (Kang).*

* cited by examiner

*Primary Examiner* — King Poon
*Assistant Examiner* — David S Cammack
(74) *Attorney, Agent, or Firm* — Gibb I.P. Law Firm, LLC

(57) ABSTRACT

Embodiments herein include a method that receives a previously created variable data print file. The method iterates through pages of the variable data print file to identify reused objects and decomposes the variable data print file into a decomposed document template, comprising the reused objects, and into a decomposed (factored) variable data file, comprising objects other than the reused objects. In some embodiments the method can further decompose the reused object into image and graphic objects, and into non-image and non-graphic objects. This allows the image and graphic objects, the non-image and non-graphic objects, and/or the decomposed variable data file to be edited without needing to go back to the application that-originally generated the variable print data file.

17 Claims, 3 Drawing Sheets

DOCUMENT TEMPLATE DERIVED FROM VARIABLE DATA PRINT FILE

BACKGROUND

Embodiments herein generally relate to electrostatographic printers and copiers or reproduction machines, and more particularly, concerns deriving templates from variable data print files.

The details regarding variable documents are well-known to those ordinarily skilled in the art and a redundant discussion of the same is avoided herein. For example, U.S. patent applications Ser. Nos. 2002/0191219, 2005/0141035, and 2005/0180648, the complete disclosures of which are incorporated herein by reference, discuss the operation variable documents in detail.

Variable data print files are typically the result of applying a data set to a document template and a set of rules for merging the data with the template. Once the print file is created, the logical document template no longer exists within the print file. If any changes need to be made to this file, they must be done on every page on which the instance of the change needs to be made; otherwise, the editor must go back to the originating application, make the change, and regenerate the print file. This can be very time consuming and prohibitively expensive.

SUMMARY

Embodiments herein include a method that receives a previously created variable data print file. The method iterates through pages of the variable data print file to identify reused objects and decomposes the variable data print file into a decomposed document template, comprising the reused objects, and into a decomposed (factored) variable data file, comprising objects other than the reused objects. In some embodiments the method can further decompose the reused object into image and graphic objects, and into non-image and non-graphic objects. This allows the image and graphic objects, the non-image and non-graphic objects, and/or the decomposed variable data file to be edited without needing to go back to the application that originally generated the variable print data file.

The original application applies rules to original document data and to an original document template to produce the first variable data print file. The decomposed document template can be the same or different than the original document template. The method further comprises, after the editing, recomposing the decomposed document template and the decomposed variable data file to produce a recomposed variable data print file. Finally, the method prints the recomposed variable data print file.

An apparatus embodiment comprises a variable data application that is adapted to generate a variable data print file. A variable data print file decomposer is operatively connected to the variable data application. The variable data print file decomposer is adapted to decompose the variable data print file into a decomposed document template and a decomposed variable data file. A variable data print file editor is operatively connected to the variable data print file decomposer. The variable data print file editor is adapted to edit the decomposed document template and/or the decomposed variable data file.

The variable data application is adapted to apply rules to the original document data and to the original document template to produce the variable data print file. The variable data print file editor is further adapted to, after the editing, recompose the decomposed document template and the decomposed variable data file to produce a recomposed variable data print file. The apparatus further comprises a printer operatively connected to the variable data print file editor. The printer is adapted to print the recomposed variable data print file.

The embodiments herein allow late changes to be made much easier and with more reliability by decomposing the variable data print file into a decomposed template and decomposed (factored) data. This allows the user to edit the decomposed template and/or decomposed data. Then, the new/revised recomposed variable data print file can be sent to the printer, without having to change all pages individually or having to return to the original variable data application. Embodiments herein also allow late stage editing of image and graphic objects, for example to adjust the color of an image that was not printing well.

These and other features are described in, or are apparent from, the following detailed description.

BRIEF DESCRIPTION OF THE DRAWINGS

Various exemplary embodiments of the systems and methods are described in detail below, with reference to the attached drawing Figures, in which.

DETAILED DESCRIPTION

Figure 1:
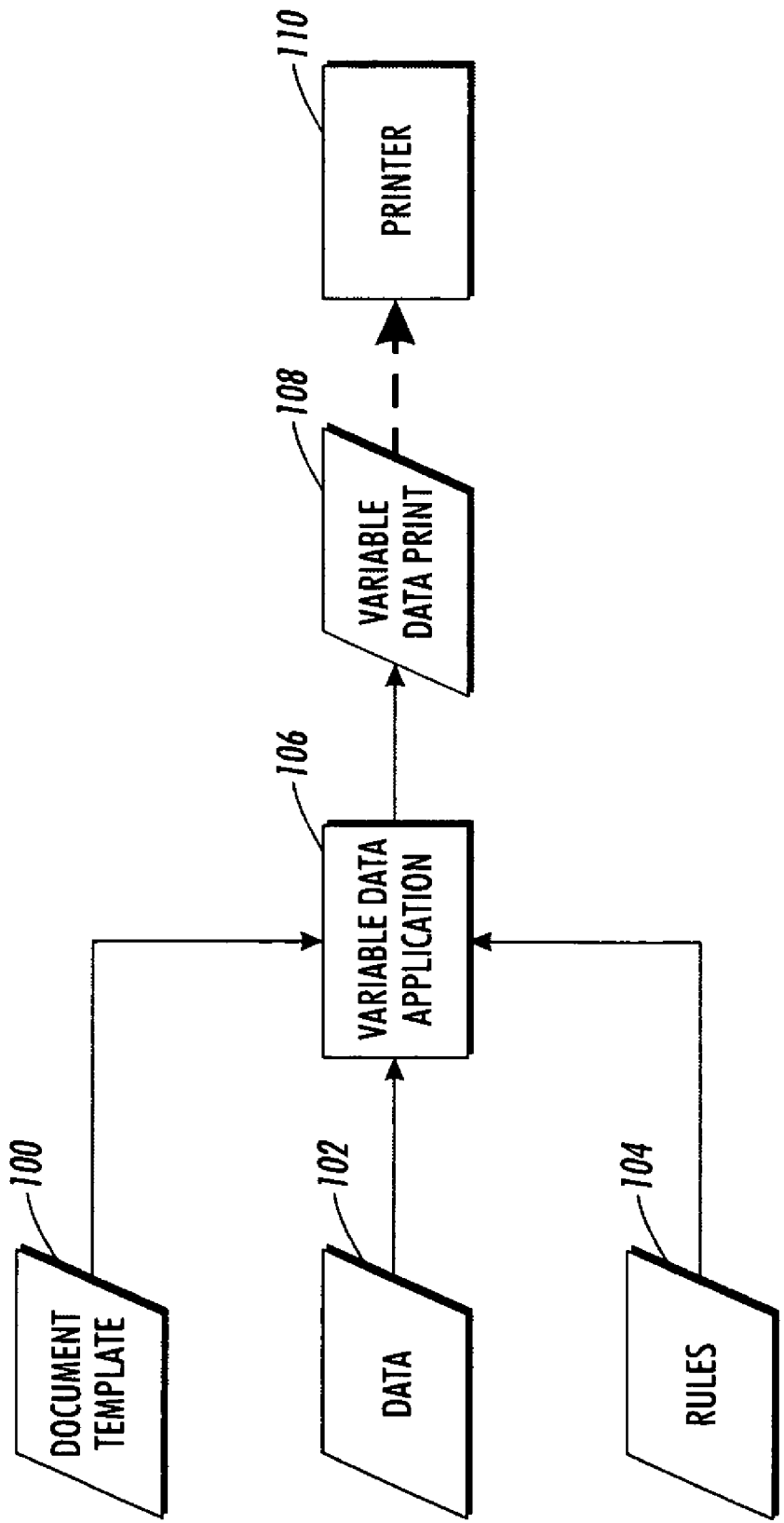
FIG. 1 is a schematic diagram of a process flow and apparatus for processing a variable data print file.

FIG. 1, depicts a variable data document workflow. The variable data application 106 typically will take the document template 100 and apply the rules 104 to the data 102 to generate a large variable data print file 108 (for example, a PPML file or a VIPP file) where each template element is repeated on each page of the variable data file 108 as discussed in, for example, U.S. patent applications Ser. Nos. 2002/0191219, 2005/0141035, and 2005/0180648, mentioned above. A very simple example of such a system is a mailing list application where a name and address is applied to a standard document. Note that in reality variable data applications can be extremely complex with variable text, images, and layout. The variable data print file 108 comprises individual pages that are printed by the printer 110. Note that the print process 110 is often physically separated from the variable data print file creation performed by the variable data application 106. For example, the print file 108 can be created in a creative shop and the printing can be done at a commercial printer.

If changes needed to made to the variable data print file 108 at the point of printing, either the changes would need to be made to every instance of the object that needed changing (potentially changing every page individually), or one would have to go back to the originating application 106, make the change to the document template 100, and regenerate the variable data print file 108 again. Both operations are prohibitively expensive and time consuming.

Figure 2:
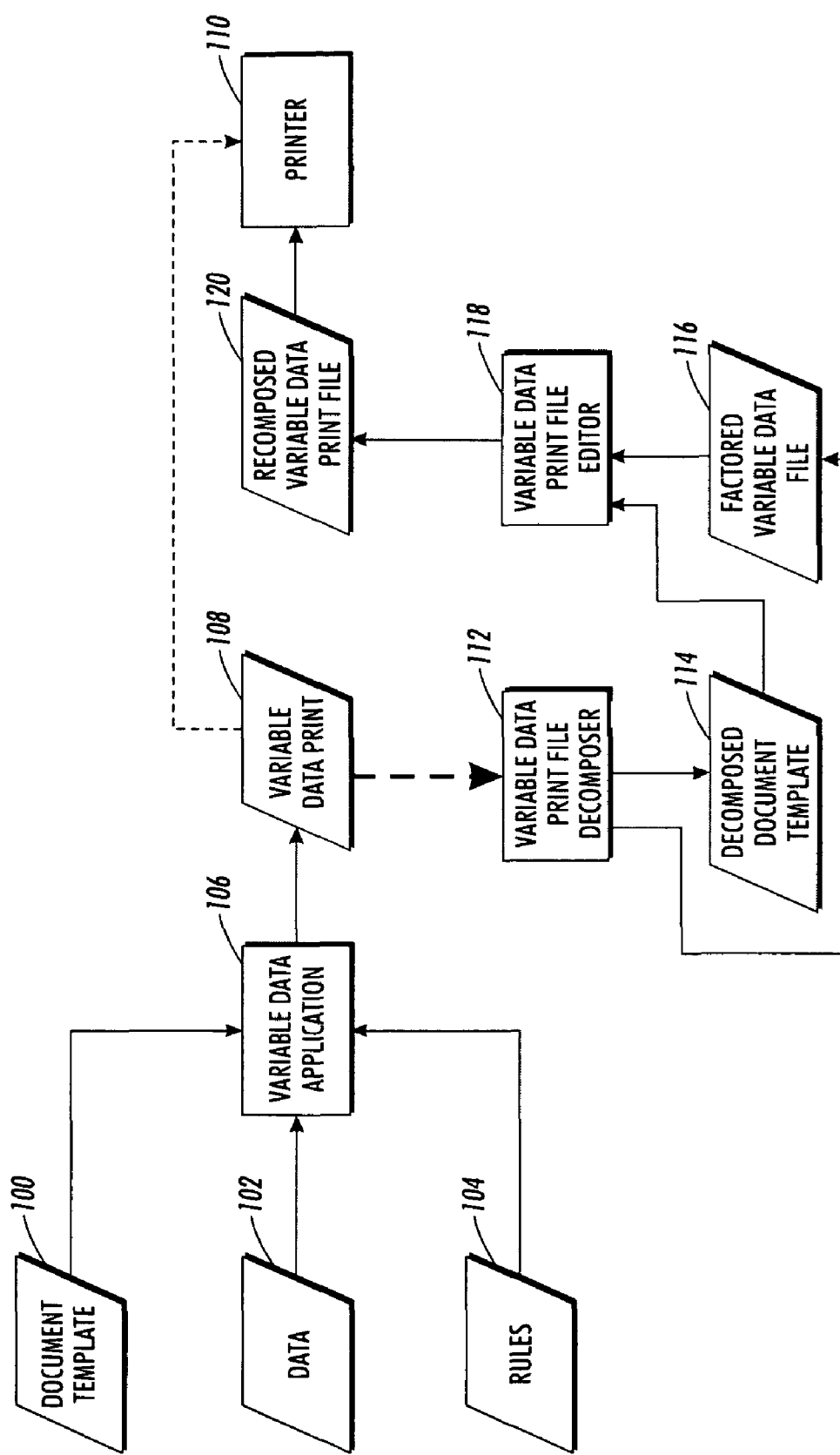
FIG. 2 is a schematic diagram of a process flow and apparatus for processing a variable data print file.
Figure 3:
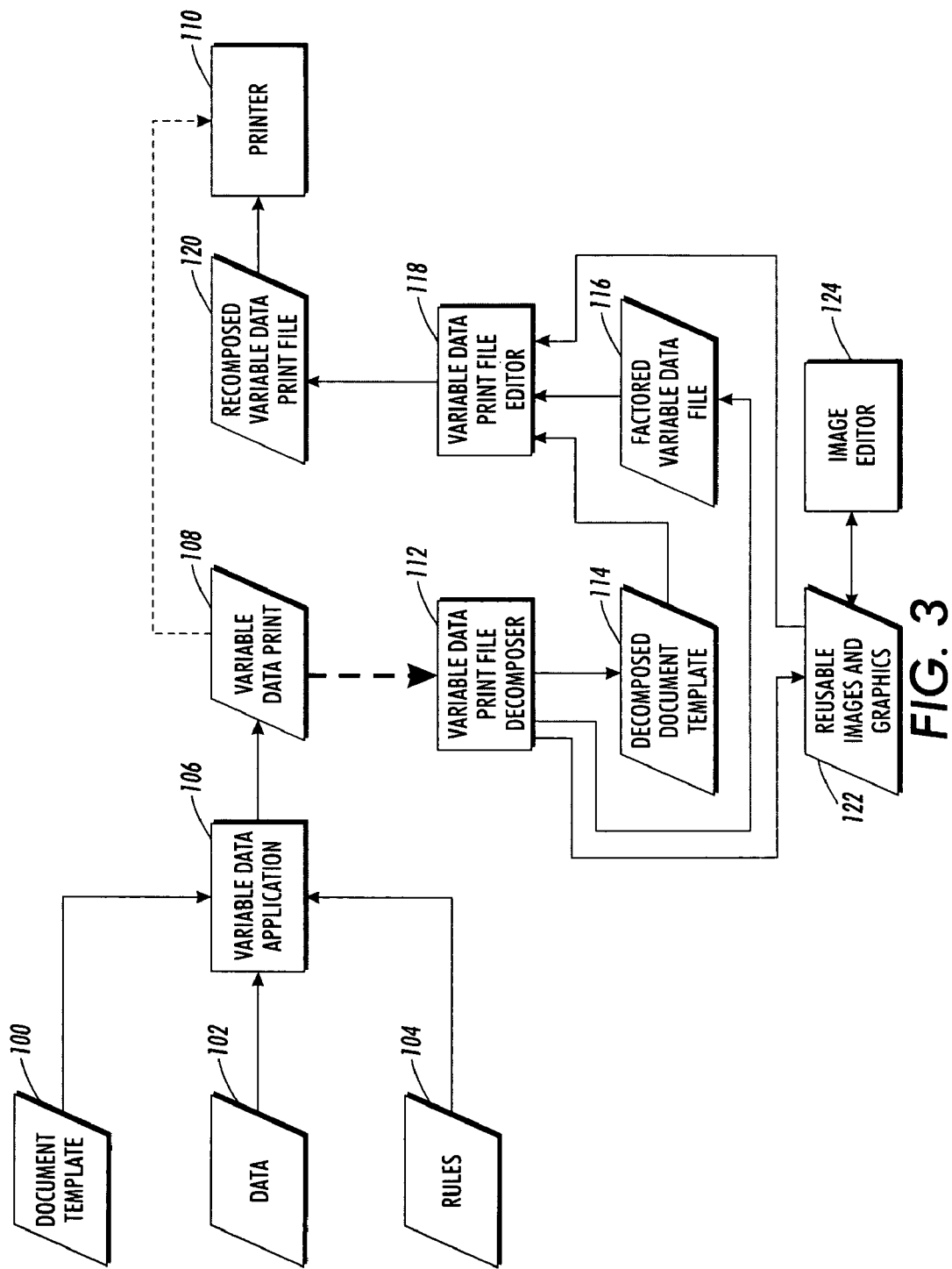
FIG. 3 is a schematic diagram of a process flow and apparatus for processing a variable data print file.

The systems shown in FIGS. 2 and 3 allow late changes to be made much easier and with more reliability by decomposing the variable data print file into a decomposed template 114 and decomposed (factored) data 116, allowing the user to edit the decomposed template 114 and/or decomposed data 116, and then recomposing a new/revised recomposed variable data print file 120 that is then sent to the printer 110. More specifically, in the embodiment shown in FIG. 2, after the variable data print file 108 is created, the user is given an option to either send that file 108 to the printer 110 or initiate the decomposing and editing process as indicated by the dashed lines.

If the user chooses to initiate the decomposing and editing process, processing flows to the variable data print file decomposer 112. The variable data print file decomposer 112 analyzes the variable data print file 108 to identify reused items within each of the pages of the variable data print file 108 (items that regularly occur in the same locations in the pages of the variable data print file 108). These reoccurring or reused items form the decomposed document template 114 (irrespective of whether such items were included in the original document template 100). Therefore, while the decomposed document template 114 can be identical to the original document template 100, if the application of the data 102 according to the rules 104 made a consistent change that added to, or subtracted from, the original document template 100, the decomposed document template 114 could potentially be different than the original document template 100. The items that do not occur with sufficient repetition or regularity are not part of the decomposed document template 114 and, instead, form the factored (decomposed) variable data 116.

The variable data print file decomposer 112 parses the variable data print file 108 and extracts the decomposed document template 114. As would be understood by one ordinarily skilled in the art in light of this disclosure, the decomposed document template 114 can be extracted using a number of different methods. For example, the variable data print file decomposer 112 can iterate through each logical page of the variable data print file 108 marking all reusable objects that are used on every page. The variable data print file decomposer 112 need not transform the print file 108 into an intermediate format. The variable data print file decomposer 112 can keep the decomposed document template 114 and decomposed variable data print file 116 in the native format of the variable data print file 108.

This process then passes the decomposed document template 114 and the decomposed variable data file 116 to the variable data print file editor 118. The variable data print file editor 118 allows the user to edit the decomposed document template 114 and/or the decomposed variable data file 116. After the decomposed variable data file 116 and/or decomposed document template 114 are edited by the user using a variable data print file editor 118, the variable data print file editor 118 recomposes a new variable data print file entitled the recomposed variable data print file 120, which is then sent to the printer 110 to be printed. The variable data print file editor 118 performs essentially a reverse process of the variable data print file decomposer 112 (a process which is similar to that performed by the variable data application 106) to create the recomposed variable data print file 120.

In the embodiment shown in FIG. 3, the variable data print file decomposer 112 further parses the variable data print file 108 and factors out image or graphic reusable objects. This allows late stage editing of image and graphic objects, for example to adjust the color of an image that was not printing well. That is, in the embodiment shown in FIG. 3, the variable data print file decomposer 112 parses the reusable images and graphics into reusable images and graphics 122. These items can be edited by the image editor 124. The non-images and non-graphics items that are reusable (text, tables, etc.) are parsed into the decomposed document template 114. This decomposition process is similar to that discussed above except that a standard image/graphic recognition tools added to the variable data print file decomposer 112. Once the images/graphics are edited by the user using the image editor 124, the edited images/graphics are sent to the variable data print file editor 118. The variable data print file editor 118 recomposes as the recomposed variable data print file 120 from the decomposed document template 114, the decomposed variable data print file 116, and the reusable images and graphics 122 in processing similar to that discussed above.

Thus, as shown above, method embodiments herein receive a previously created variable data print file 108. The method iterates through pages of the variable data print file 108 to identify reused objects and decomposes the variable data print file 108 into the decomposed document template 114, comprising the reused objects, and into the decomposed (factored) variable data file 116, comprising objects other than the reused objects. In some embodiments the method can further decompose the reused object into image and graphic objects maintained in the reusable images and graphics 122, and into non-image and non-graphic objects that are maintained in the decomposed document template 114. This allows the image and graphic objects, the non-image and non-graphic objects, and/or the decomposed variable data file 116 to be edited (using the image editor 124 and the variable data print file editor 118) without needing to go back to the application 106 that originally generated the variable print data file 108.

The original application 106 applies rules 104 to original document data and to an original document template 100 to produce the first variable data print file 108. The decomposed document template 114 can be the same or different than the original document template 100. The method further comprises, after the editing, recomposing (using the variable data print file editor 118) the decomposed document template 114 and the decomposed variable data file 116 to produce the recomposed variable data print file 120. Finally, the method prints the recomposed variable data print file using the printer 110.

An apparatus embodiment comprises the variable data application 106 that is adapted to generate the variable data print file 108. The variable data print file decomposer 112 is operatively connected to the variable data print file 108. The variable data print file decomposer is adapted to decompose the variable data print file 108 into the decomposed document template 114 and the decomposed variable data file 116. The variable data print file editor 118 is operatively connected to the decomposed document template 114 and the decomposed variable data file 116. The variable data print file editor is adapted to edit the decomposed document template 114 and/or the decomposed variable data file 116.

The variable data application 106 is adapted to apply rules 104 to the original document data and to the original document template 100 to produce the variable data print file 108. The variable data print file editor 118 is further adapted to, after the editing, recompose the decomposed document template 114 and the decomposed variable data file 116 to produce the recomposed variable data print file 120. The apparatus further comprises the printer 110 that is operatively connected to the recomposed variable data print file editor 118 and the recomposed variable data print file 120. The printer 110 is adapted to print the recomposed variable data print file 120 and the original variable data print file 108.

As mentioned above, once a variable data print file is created by the variable data print file application, the logical document template no longer exists within the print file. If any changes need to be made to this file, they must be done on every page on which the instance of the change needs to be made; otherwise, the editor must go back to the originating application, make the change, and regenerate the print file. This can be very time consuming and prohibitively expensive. The embodiments shown above allow late changes to be made much easier and with more reliability by decomposing the variable data print file into a decomposed template and decomposed (factored) data. This allows the user to edit the decomposed template and/or decomposed data. Then, the new/revised recomposed variable data print file can be sent to the printer, without having to change all pages individually or having to return to the original variable data application. Embodiments herein also allow late stage editing of image and graphic objects, for example to adjust the color of an image that was not printing well.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:
   using a computer, receiving a first variable data print file formed from a first document template, said first variable data print file comprising data of multiple pages; and
   using said computer, making changes to said first variable data print file, said making of said changes comprising:
   using said computer, factoring said first variable data print file into non-image-based reused objects to create a factored document template, into image-based reused objects and into non-reused objects to create a factored variable data file, each of said image-based reused objects and said non-image based reused objects comprising an object that repeatedly occurs at a same location on each page of said first variable data print file and said factored document template being different from said first document template in that at least some objects in said factored document template were not present in said first document template;
   using said computer, editing any of said image-based reused objects, said factored document template and said factored variable data file; and
   after said editing, recomposing said factored document template, said image-based reused objects, and said factored variable data file to produce a recomposed variable data print file.

2. The method according to claim 1, said at least some objects in said factored document template that were not present in said first document template comprising document data that was previously used to form said first variable data print file.

3. The method according to claim 1, further comprising printing said recomposed variable data print file.

4. A computer-implemented method comprising:
   using a computer, receiving a first variable data print file formed from a first document template, said first variable data print file comprising data of multiple pages; and
   using said computer, making changes to said first variable data print file, said making of said changes comprising:
   using said computer, iterating through said pages of said first variable data print file to identify non-image-based reused objects, image-based reused objects and non-reused objects, each of said image-based reused objects and said non-image based reused objects comprising an object that repeatedly occurs at a same location on each page of said first variable data print file;
   using said computer, factoring said first variable data print file into said non-image-based reused objects to create a factored document template, into said image-based reused objects, and into said non-reused objects to create a factored variable data file, said factored document template being different from said first document template in that at least some objects in said factored document template were not present in said first document template;
   using said computer, editing any of said image-based reused objects, said factored document template and said factored variable data file; and
   after said editing, recomposing said factored document template, said image-based reused objects, and said factored variable data file to produce a recomposed variable data print file.

5. The method according to claim 4, further comprising applying rules to document data and to said first document template to produce said first variable data print file.

6. The method according to claim 5, said at least some objects in said factored document template that were not present in said first document template comprising at least some of said document data that was previously used to produce said first variable data print file.

7. The method according to claim 4, said editing comprising editing at least some of said image-based reused objects by making color adjustments.

8. The method according to claim 4, further comprising printing said recomposed variable data print file.

9. A computer-implemented method comprising:
   using a computer, receiving a first document template and document data;
   using said computer, applying rules to produce, from said first document template and said document data, a first variable data print file, said first variable data print file comprising data of multiple pages; and
   using said computer, making changes to said first variable data print file, said making of said changes comprising:
   using said computer, iterating through said pages of said first variable data print file to identify non-image-based reused objects, image-based reused objects and non-reused objects, each of said image-based reused objects and said non-image based reused objects comprising an object that repeatedly occurs at a same location on each page of said first variable data print file;

using said computer, factoring said first variable data print file into said non-image-based reused objects to create a factored document template into said image-based reused objects, and into said non-reused objects to create a factored variable data file, said factored document template being different from said first document template in that at least some objects in said factored document template were not present in said first document template;

using said computer, editing any of said image-based reused objects, said factored document template and said factored variable data file; and after said editing, recomposing said factored document template, said image-based reused objects, and said factored variable data file to produce a recomposed variable data print file.

10. The method according to claim 9, said editing comprising editing at least some of said image-based reused objects by making color adjustments.

11. The method according to claim 9, said at least some objects in said factored document template that were not present in said first document template comprising at least some of said document data that was previously used to produce said first variable data print file.

12. The method according to claim 9, further comprising printing said recomposed variable data print file.

13. A non-transitory computer storage medium readable by computer and storing a program of instructions executable by said computer to decompose a variable print file, said program comprising steps for:

receiving a first variable data print file formed from a first document template, said first variable data print file comprising data of multiple pages;

making changes to said first variable data print file, said making of said changes comprising:

factoring said first variable data print file into non-image-based reused objects to create a factored document template, into image-based reused objects and into non-reused objects to create a factored variable data file, each of said image-based reused objects and said non-image based reused objects comprising an object that repeatedly occurs at a same location on each page of said first variable data print file and said factored document template being different from said first document template in that at least some objects in said factored document template were not present in said first document template;

editing any of said image-based reused objects, said factored document template and said factored variable data file; and after said editing, recomposing said factored document template, said image-based reused objects, and said factored variable data file to produce a recomposed variable data print file; and printing said recomposed variable data print file.

14. An apparatus comprising:

a computer making changes to a first variable data print file formed from a first document template, said first variable data print file comprising data of multiple pages;

said computer comprising:

a variable data print file factoring module receiving said first variable data print file and factoring said first variable data print file into non-image-based reused objects to create a factored document template, into image-based reused objects and into non-reused objects to create a factored variable data file, each of said image-based reused objects and said non-image based reused objects comprising an object that repeatedly occurs at a same location on each page of said first variable data print file and said factored document template being different from said first document template in that at least some objects in said factored document template were not present in said first document template;

a variable data print file editor operatively connected to said factoring module said variable data print file editor editing any of said image-based reused objects, said factored document template and said factored variable data file; and, after said editing, recomposing said factored document template, said image-based reused objects, and said factored variable data file to produce a recomposed variable data print file; and a printer operatively connected to said computer, said printer printing said recomposed variable data print file.

15. The apparatus according to claim 14, said computer further comprising a variable data application applying rules to document data and to said first document template to produce said first variable data print file, said at least some objects in said factored document template that were not present in said first document template comprising at least some of said document data that was previously used to produce said first variable data print file.

16. The apparatus according to claim 14, said editing comprising editing at least some of said image-based reused objects by making color adjustments.

17. The apparatus according to claim 16, said computer providing for a user to initiate said making of said changes.

* * * * *